(12) United States Patent
McMahon et al.

(10) Patent No.: US 8,584,964 B2
(45) Date of Patent: Nov. 19, 2013

(54) DISTRIBUTION SYSTEM FOR LIQUID MANURE SPREADER

(75) Inventors: Randy M. McMahon, Lakeville, MN (US); Frank D. Bazzoli, St. James, MN (US); Donald R. Marcy, Bingham Lake, MN (US); Ronald J. Veenker, Bingham Lake, MN (US)

(73) Assignee: Balzer, Inc., Mountain Lake, MN (US)

( * ) Notice: Subject to any disclaimer, the term of this patent is extended or adjusted under 35 U.S.C. 154(b) by 770 days.

(21) Appl. No.: 12/850,755

(22) Filed: Aug. 5, 2010

(65) Prior Publication Data

US 2012/0032003 A1    Feb. 9, 2012

(51) Int. Cl.
| | |
|---|---|
| *B05B 17/04* | (2006.01) |
| *B05B 3/02* | (2006.01) |
| *B05B 1/20* | (2006.01) |
| *B05B 9/00* | (2006.01) |
| *F23D 11/04* | (2006.01) |

(52) U.S. Cl.
USPC ........... 239/7; 239/214.15; 239/159; 239/175

(58) Field of Classification Search
USPC ........ 239/7, 494, 214.15, 159, 175, 390, 562, 239/662, 170, 172, 214–216; 137/561, 137/625.15, 625.11, 271, 561 A; 111/120–122
See application file for complete search history.

(56) References Cited

U.S. PATENT DOCUMENTS

| | | | | | |
|---|---|---|---|---|---|
| 1,348,885 | A | * | 8/1920 | Laffoon | 222/330 |
| 3,968,933 | A | * | 7/1976 | Waldrum | 239/171 |
| 4,232,616 | A | * | 11/1980 | van der Lely | 111/121 |
| 4,530,462 | A | * | 7/1985 | Andersson | 239/7 |
| 5,271,567 | A | * | 12/1993 | Bauer | 239/662 |
| 5,272,992 | A | * | 12/1993 | Barbour et al. | 111/120 |
| 5,435,493 | A | | 7/1995 | Houle | |
| 5,547,128 | A | * | 8/1996 | Scheffler | 239/77 |
| 6,196,266 | B1 | * | 3/2001 | Breda | 137/625.11 |
| 6,202,942 | B1 | * | 3/2001 | Hultgreen et al. | 239/214.15 |
| RE37,863 | E | | 10/2002 | Depault | |
| 7,159,889 | B2 | | 1/2007 | Nuhn et al. | |
| 7,497,388 | B2 | | 3/2009 | Depault | |
| 7,509,977 | B2 | | 3/2009 | Huffman | |
| 7,775,168 | B2 | * | 8/2010 | Sidhwa et al. | 111/118 |
| 7,780,097 | B2 | * | 8/2010 | Puck | 239/214.15 |

\* cited by examiner

*Primary Examiner* — Len Tran
*Assistant Examiner* — Chee-Chong Lee
(74) *Attorney, Agent, or Firm* — C. G. Mersereau; Nikolai & Mersereau, P.A.

(57) ABSTRACT

A liquid manure spreader includes a hollow housing chamber having a generally cylindrical sidewall, a chamber bottom provided with a pattern of obround outlet openings, an array of outlet tubes connected to receive material through the obround openings and an inlet cover on the housing. The slurry distributor also includes a rotating hollow expeller member to secure and distribute slurry to the obround outlets having a central rotational axis and a plurality of outlet chambers which have cutter blades attached. A hydraulic motor is connected to rotate the expeller in the housing chamber. A cutter plate is mounted to the chamber bottom and has a pattern of obround openings matching that in the chamber bottom that cooperates with the cutter blade to prevent clogging of the outlet openings.

11 Claims, 4 Drawing Sheets

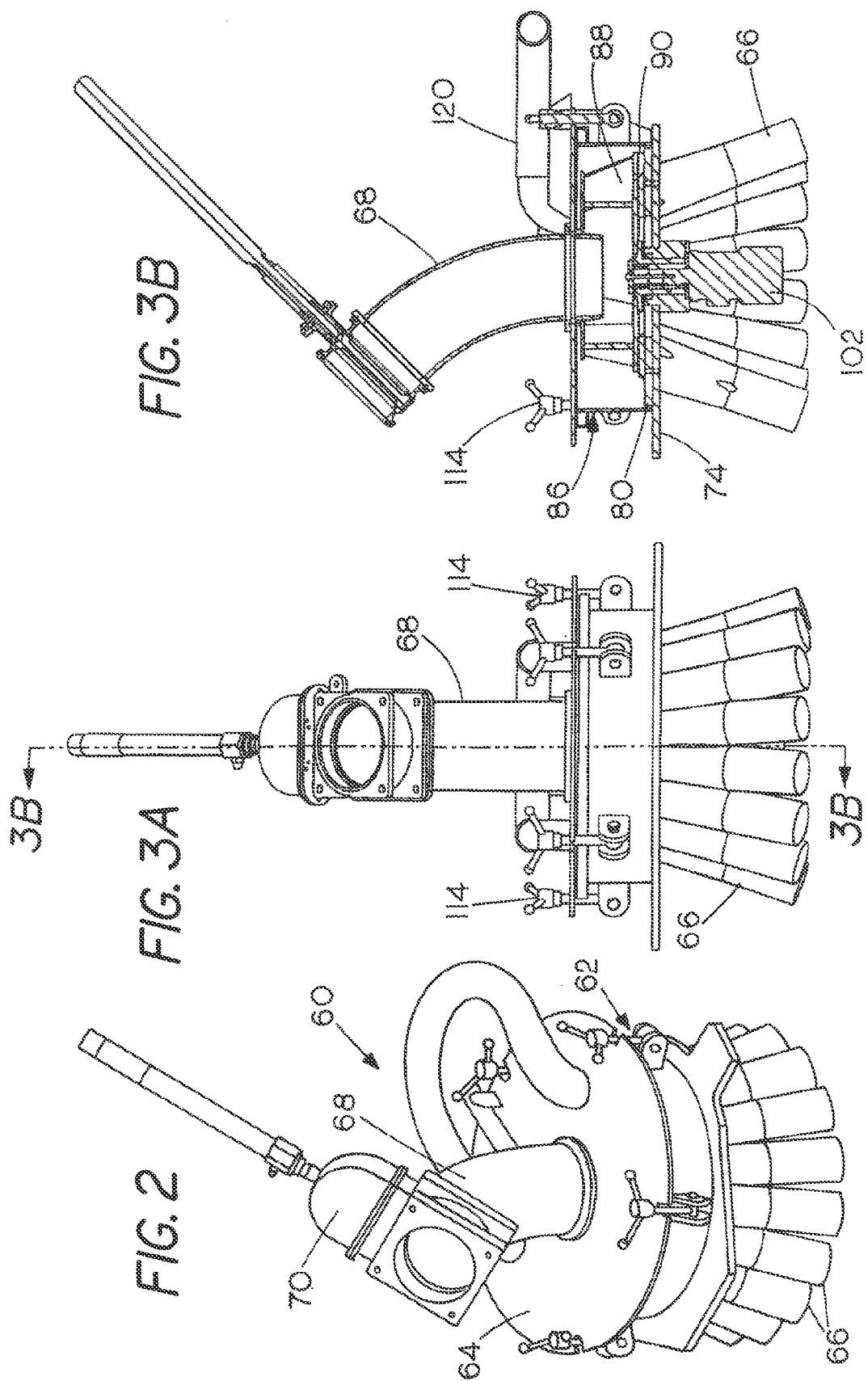

US 8,584,964 B2

DISTRIBUTION SYSTEM FOR LIQUID MANURE SPREADER

CROSS-REFERENCED TO RELATED APPLICATIONS

Cross references is made to application Ser. No. 12/850,761, filed of even date and entitled "AGRICULTURE DISTRIBUTION SYSTEM", which is assigned to the same Assignee as the present application. That application is deemed incorporated herein in its entirety for any purpose.

STATEMENT REGARDING FEDERALLY SPONSORED RESEARCH OR DEVELOPMENT

Not applicable

BACKGROUND OF THE INVENTION

I. Field of the Invention

The present invention relates generally to agricultural implements and, more particularly, to a slurry distributor to divide and route liquid materials received from a common source evenly to a plurality of locations. Specifically, the present invention relates to a slurry distributor system that enables the even and equal metering of liquid manure to a plurality of outlets at different distances resulting in uniform placement or even distribution of material into the soil across a wide swath.

II. Related Art

Liquid manure spreaders are used in the transportation and application of liquid manure which is obtained generally from manure lagoons associated with the keeping of farm livestock and spread on agricultural fields. The liquid manure is generally in the form of a slurry of liquid and solid animal wastes produced from farming operations which can be pumped out of a lagoon and distributed.

Liquid manure spreaders generally include one or more tanks mounted on a chassis towed by a tractor. The tanks may be of rather large capacity and are normally connected to a plurality of spaced outlets which distribute the liquid manure into the ground, typically using soil injection tools. The liquid manure is usually pumped from the tanks into a central distribution manifold, which has a number of outlet openings. These openings, in turn, are connected by hoses to soil injection tools, or the like, located at spaced intervals which are at varying distances from the central distribution manifold. Generally, there is no control system to insure even distribution of the liquid manure to the several soil locations so that the manure flows unevenly from the hoses as the longer hoses to the more distant outlets exhibit more resistance to flow.

Attempts have been made to more evenly distribute sludge or manure to a plurality of distributed hoses. U.S. Pat. No. 7,509,977 B2 to Huffman uses rotating occluding baffles of different lengths to control back pressure at a plurality of outlets over a range of supply pressures. That system is meant to deal with supply pressures that vary widely and requires the changing of baffle lengths to accommodate different supply pressures.

Thus, there remains a need for a slurry distributor that enables equal proportioning through a plurality of outlets which is relatively simple in construction and requires little maintenance.

SUMMARY OF THE INVENTION

By means of the present invention, a slurry distributor device and method are provided for delivering precise and equal amounts of liquid slurry materials from a common source to a plurality of locations. The system is particularly useful to distribute liquid manure slurry to a plurality of spaced soil incorporation tools located at different distances from the distributor.

One embodiment includes a hollow housing chamber having a generally cylindrical sidewall, a chamber bottom provided with a radial pattern of obround (elongate) outlet openings, an array of outlet tubes connected to receive material through the obround openings and an inlet cover on the housing. The slurry distributor also includes a hollow expeller member for receiving and distributing slurry material. The expeller has a central rotational axis mounted for rotation in the chamber and a plurality of outlet chambers which have cutter blades attached and a hydraulic motor is connected to rotate the expeller in the housing chamber. A cutter plate is mounted above the chamber bottom and has a pattern of obround openings matching that in the chamber bottom.

In operation, slurry from a source, normally pumped from liquid manure tanks, enters the housing chamber under pressure through a pipe connected through the inlet cover and is supplied to the expeller where it is distributed through the obround openings with equal force as the expeller rotates. The cutter blades and cutter plate cooperate to chop up solids and prevent clogging of any of the outlet openings.

BRIEF DESCRIPTION OF THE DRAWINGS

In the drawings wherein like reference characters denote like parts:

FIG. 2 is a perspective view of a liquid slurry distribution system in accordance with the invention;

FIG. 3A is a side elevational view of the liquid slurry distribution system of FIG. 2;

FIG. 3B is a sectional view taken along line B-B of FIG. 3A;

DETAILED DESCRIPTION

The present invention enables equal distribution of a manure slurry from one or more mounted slurry tanks through a plurality of spaced soil treatment tools that may address application across many crop rows in a typical agriculture field using a rather simple, but effective, slurry distributor system in which feed from a single inlet supplies a plurality of outlets which, in turn, supply soil treatment tools located at varying distances from the distributor with equal amounts of slurry. Embodiments described herein are introduced as examples of the concepts of the invention and are not intended to limit the scope in any manner as variations within these concepts may occur to those skilled in the art.

Figure 1:
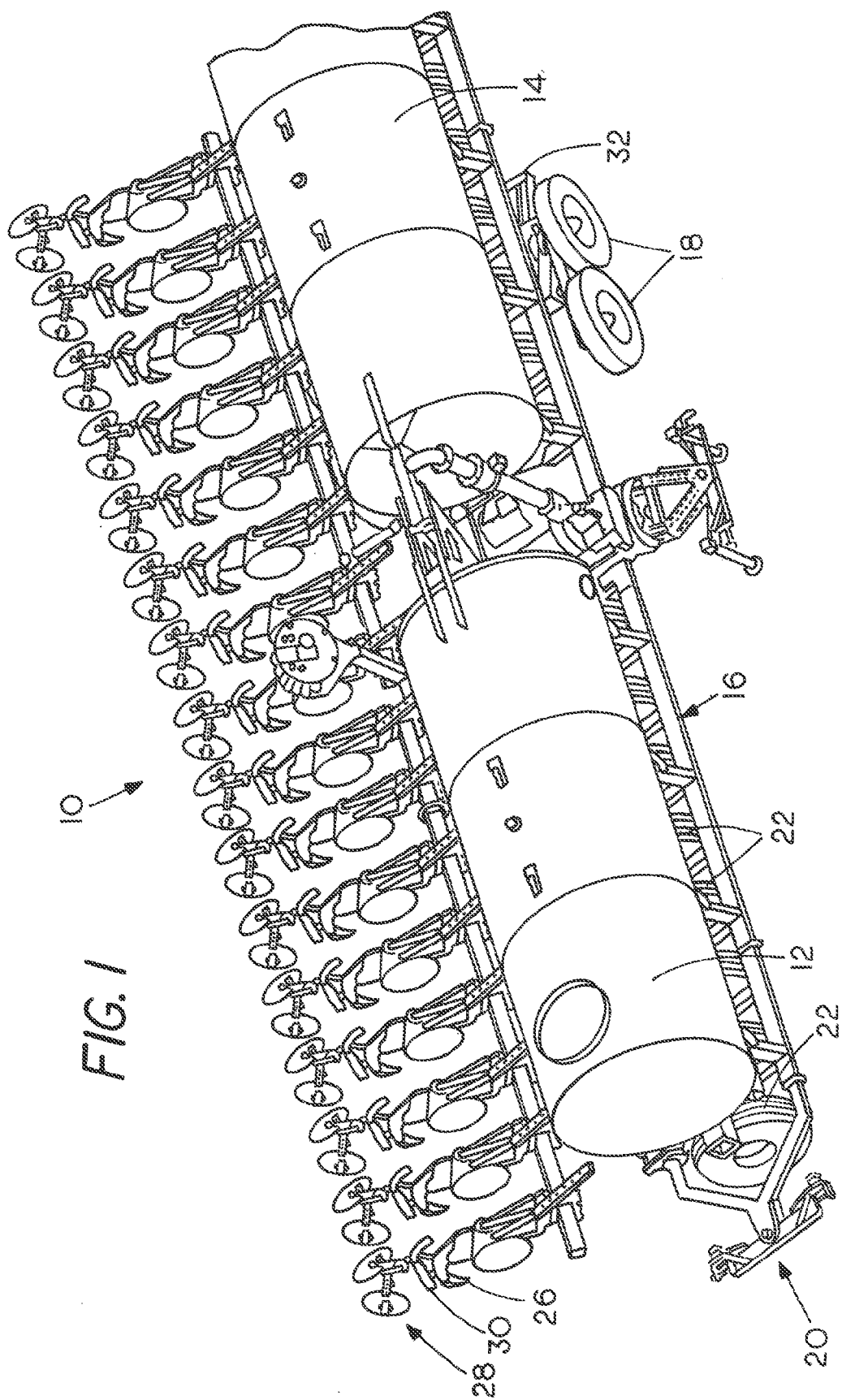
FIG. 1 is a fragmentary view of dual slurry tank manure spreading system incorporating a liquid manure slurry distributing system in accordance with the present invention.

In the drawings, FIG. 1 shows a fragmentary view of a slurry tank manure spreading system incorporating a liquid manure spreading distribution system in accordance with the present invention. The system, generally at 10, includes a pair of large spaced slurry tanks 12 and 14 mounted on a heavy metal chassis 16 which includes orthogonally situated sets of support wheels and hitches. These include a highway set, two of which are shown at 18 with highway hitching arrangement 20 for transporting the system on roadways, for example, from work site to work site in an unloaded condition. Orthogonally-mounted spaced wheels as at 22 are located along the length of the chassis 16 and a second hitching arrangement is shown at 24 for hitching the system to a tractor (not shown) for distributing the contents of the tanks across an agricultural field. Spaced agriculture tillage devices such as plow bits 26 and discs 28 may be included along with manure injectors as at 30. The system shown in FIG. 1 is designed to treat 16 spaced crop rows simultaneously, but the system can be designed to treat any convenient number. The sets of wheels 18 are mounted on a tag axle arrangement as at 32 which enables them to be raised out of contact with the ground when the orthogonally-mounted wheels are to be used.

Figure 6:
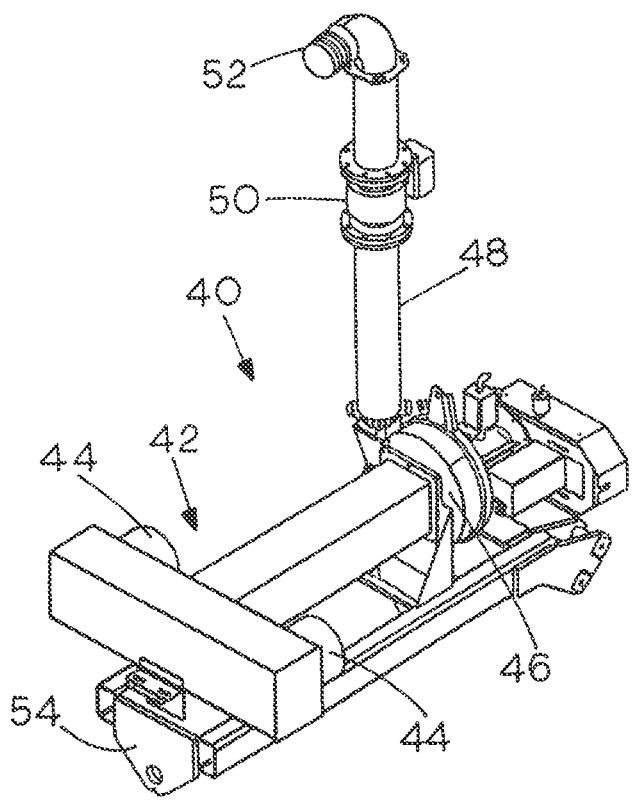
FIG. 6 is a perspective view of a central slurry feed system.

Slurry from the tanks 12 and 14 is fed using a central slurry feed system such as is shown at 40 in FIG. 6 which includes a tee inlet 42 configured to receive slurry from two spaced slurry tanks through access tee pipe inlets 44 and supply it to the intake of slurry pump 46 which pumps the slurry through a supply pipe 48 which includes a flow meter 50 and is connected by an elbow to a hose barb 52. A flexible hose (not shown) connects the feed system to the slurry distributor, as will be described. The system is mounted on a frame 54.

As shown in the perspective view of FIG. 2, the slurry distributor of the invention, generally at 60, includes a main distributor housing 62, a cover 64 and a plurality of outlet tubes 66. An inlet pipe is shown at 68 with a gate valve at 70.

Figure 4:
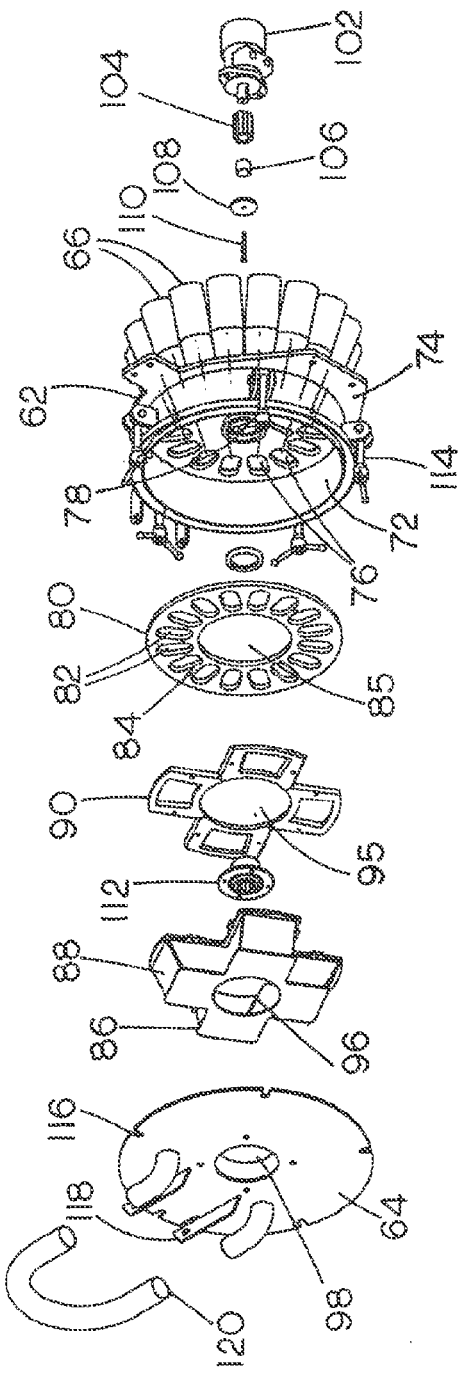
FIG. 4 is a top to bottom exploded view of the liquid slurry distribution system of FIGS. 2 and 3A-3B.
Figure 5:
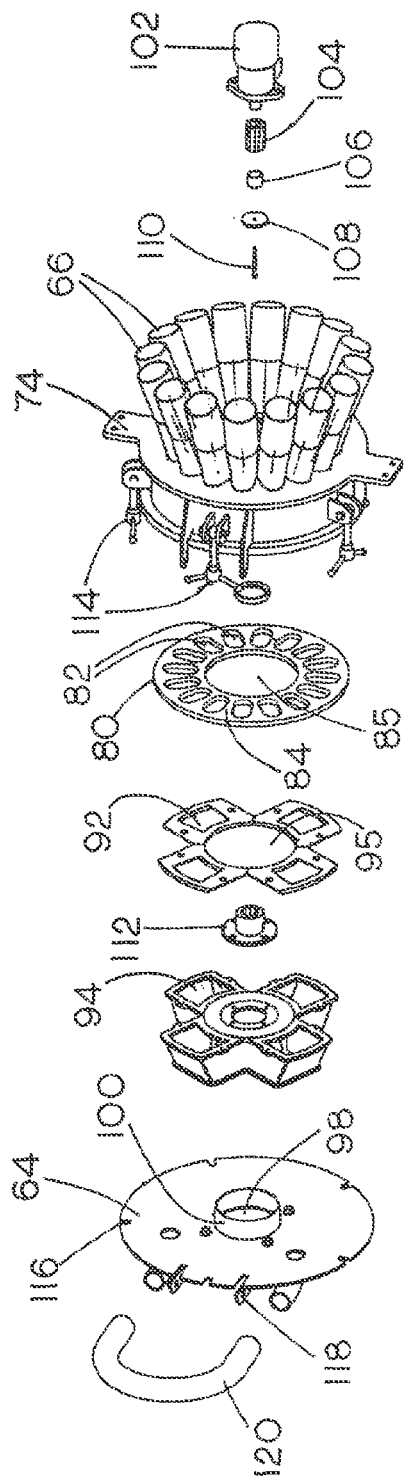
FIG. 5 is a bottom to top exploded view of the liquid slurry distribution system of FIGS. 2 and 3A-3B.

The parts of the slurry distributor are best seen in FIGS. 4 and 5 which depict top and bottom exploded views of the distributor of the invention. The distributor housing 62 has a hollow, generally cylindrical interior described by a sidewall 72 and a bottom member 74. The bottom member 74 is a heavy gauge flat plate and is provided with an array of obround or elongated openings 76 arranged in a radial pattern and to which obround to round transectioning distribution tubes 66 are fitted. The bottom member 74 further includes a central opening at 78. A cutter plate 80 with a matching array of obround openings 82 is mounted on and fixed to bottom member 74 in aligned relation through bolt holes as at 84 and is also provided with a central opening 85. The cutter plate can be removed and replaced as needed.

The distributor assembly further includes a hollow rotating expeller device 86 having a plurality of hollow lobes 88. The expeller carries a cutter blade member 90 fixed to the underside of the expeller and which has a plurality of openings 92 which align with corresponding openings 94 in the expeller lobes 88 and includes a central opening 95. The cutter is normally bolted on to the expeller for easy removal and replacement. The expeller includes an upper central opening 96 which is open to lobes 88 for receiving slurry from inlet pipe 68 (FIG. 2) through opening 98, in cover 64 and short input tube 100 which nests in opening 96.

The combination expeller and cutter plate is driven for rotation by a hydraulic motor system including a hydraulic motor 102 shown with drive coupler 104, spacer 106, washer 108 and bolt 110 which rotates a drive hub 112 fixed to expeller 86.

The distributor housing is also provided with a plurality of swivel-mounted clamping devices 114 which cooperate with slots 116 to secure cover 64 to distributor housing 62. Cover 64 may be connected to housing 62 by hinges shown partially at 118. A hose loop 120 is also shown connected to cover 64.

The manure slurry distributor is shown assembled in FIGS. 3A and 3B. In operation, with gate valve 70 open and expeller 86 rotating, slurry to be distributed onto a field is pumped from supply tanks through a flow meter and into the manure slurry distributor where it is received in the expeller and distributed evenly under pressure through the expeller lobes to the outlet tubes 66, each of which is connected to a manure injecting tool by a flexible hose (not shown). Results have shown that a very even distribution of the slurry material occurs using this system. The amount and pressure of material pumped along with the speed of the expeller can be controlled and coordinated with the corresponding speed of the overall spreading system and amount of material to be injected.

An important aspect of the invention involves the interaction of the cutter blades 90 as they rotate at the surface of the cutter plate 80. This serves to shear off any solid debris in the slurry and prevent clogging of any of the openings 82, 76 with the cutter plate providing a shear edge to the obround or elongated openings and also, as with the cutter blades, a replaceable wear surface above the housing bottom.

While the embodiment described herein is shown supplying sixteen radially distributed outlet tubes, it will be appreciated that the system will work equally well with any convenient number of outlets as long as the relationship of the hollow expeller lobes and the obround openings is maintained.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A liquid manure slurry distributor comprising:
  (a) a hollow housing chamber having a generally cylindrical sidewall, a chamber bottom provided with a pattern of obround openings, an array of outlet tubes connected to receive material through said obround or elongated openings and an inlet cover on said housing;
  (b) a hollow expeller member having a central rotational axis mounted for rotation in said housing chamber and having cutter blades attached thereto; and
  (c) a motor connected to rotate said expeller member in said housing chamber; and
  (d) a cutter plate mounted above said chamber bottom and having a pattern of obround openings matching that in said chamber bottom.

2. A distributor as in claim 1 wherein said motor is a hydraulic motor.

3. A distributor as in claim 1 further comprising spaced reusable clamping devices for resealably closing said inlet cover.

4. A distributor as in claim 1 wherein said inlet cover is hinged to said housing chamber.

5. A distributor as in claim 4 further comprising spaced reusable clamping devices for resealably closing said inlet cover.

6. A distributor as in claim 1 wherein said obround openings are uniform in size and distributed about the chamber bottom in a regular pattern.

7. A distributor as in claim 1 wherein said expeller member has a central inlet and regular pattern of four outlet openings.

8. A distributor as in claim 1 wherein said inlet cover has a central opening to receive an inlet pipe.

9. A distributor as in claim 1 wherein said outlet tubes are adapted to transfer liquid manure slurry to hoses connected thereto.

10. A distributor as in claim 1 wherein said cutter blades and said cutter plates are attached using removable fasteners.

11. A method of providing equal distribution of a liquid manure slurry through an array of supply hoses comprising:
- (a) providing a hollow housing chamber having a generally cylindrical sidewall, a chamber bottom provided with a pattern of obround openings, an array of outlet tubes connected to receive material through said obround openings and an inlet cover on said housing; and a motor-operated rotating hollow expeller member having a central rotational axis mounted for rotation in said housing chamber and having material distributing lobes and cutter blades attached thereto;
- (b) rotating said hollow expeller member while supplying liquid manure slurry through said inlet cover to said expeller member to distribute said slurry evenly among said obround openings to said outlet tubes;
- (c) using the cutter blades in conjunction with a cutter plate mounted above and matching said bottom obround openings to prevent clogging of said obround openings.

\* \* \* \* \*